United States Patent
Darragh et al.

(10) Patent No.: US 7,027,251 B1
(45) Date of Patent: Apr. 11, 2006

(54) METHOD AND APPARATUS TO CONTROL POLE TIP PROTRUSION

(75) Inventors: Neil Darragh, Mead, CO (US); Jerry Moline, Denver, CO (US); Bruce Emo, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/337,912

(22) Filed: Jan. 6, 2003

Related U.S. Application Data (60) Provisional application No. 60/345,441, filed on Jan. 4, 2002.

(51) Int. Cl.
*G11B 21/02* (2006.01)

(52) U.S. Cl. .......................... 360/75; 360/126

(58) Field of Classification Search ............... 360/75, 360/66, 124, 137, 126, 128, 317, 244.6, 245.9, 360/294.7
See application file for complete search history.

(56) References Cited

U.S. PATENT DOCUMENTS

| | | | |
|---|---|---|---|
| 5,210,669 A * | 5/1993 | Weispfenning et al. ..... 360/124 |
| 5,303,107 A * | 4/1994 | Miura et al. ................. 360/137 |
| 5,416,652 A | 5/1995 | Lewis ......................... 360/48 |
| 5,519,546 A | 5/1996 | Lewis ......................... 360/48 |
| 5,541,784 A | 7/1996 | Cribbs et al. ................. 360/75 |
| 5,754,355 A | 5/1998 | Nakamura et al. ........ 360/73.03 |
| 5,760,990 A | 6/1998 | Ukani et al. ............. 360/77.04 |
| 5,870,241 A | 2/1999 | Ottesen et al. ........... 360/77.04 |
| 5,877,919 A * | 3/1999 | Foisy et al. .............. 360/244.6 |
| 5,880,899 A | 3/1999 | Blachek et al. .............. 360/66 |
| 5,909,661 A | 6/1999 | Abramovitch et al. ....... 702/191 |
| 5,956,200 A | 9/1999 | Kohno et al. ............. 360/77.04 |
| 5,959,801 A * | 9/1999 | Gillis et al. ................... 360/75 |
| 5,991,113 A * | 11/1999 | Meyer et al. ................. 360/75 |
| 6,052,804 A | 4/2000 | Thowe et al. ............... 714/710 |
| 6,195,219 B1 * | 2/2001 | Smith ........................... 360/66 |
| 6,307,719 B1 * | 10/2001 | Mallary ................... 360/294.7 |
| 6,369,974 B1 | 4/2002 | Asgari et al. ............. 360/78.14 |
| 6,381,094 B1 * | 4/2002 | Gill ............................ 360/126 |
| 6,452,735 B1 | 9/2002 | Egan et al. .................... 360/31 |
| 6,597,530 B1 | 7/2003 | Asano et al. ............. 360/78.14 |
| 6,614,624 B1 * | 9/2003 | Shiraishi et al. .......... 360/245.9 |
| 6,671,111 B1 | 12/2003 | Ottesen et al. ................ 360/31 |
| 6,687,083 B1 * | 2/2004 | Hsiao et al. ................. 360/126 |
| 6,714,371 B1 | 3/2004 | Codilian ...................... 360/60 |
| 6,717,763 B1 | 4/2004 | Ottesen et al. ................ 360/75 |
| 6,754,050 B1 * | 6/2004 | Kong et al. ................. 360/317 |
| 6,760,174 B1 | 7/2004 | Forehand ..................... 360/53 |
| 6,760,191 B1 * | 7/2004 | Yan et al. ................... 360/128 |

OTHER PUBLICATIONS

U.S. Appl. No. 10/338,046, filed Jan. 6, 2003, Emo.
U.S. Appl. No. 10/430,366, filed May 5, 2003, Emo et al.

* cited by examiner

*Primary Examiner*—David Hudspeth
*Assistant Examiner*—Fred F. Tzeng
(74) *Attorney, Agent, or Firm*—Tejpal S. Hansra (57) ABSTRACT

A method and apparatus to control the amount by which thermal expansion causes a write head to extend toward a disk is provided. In one aspect, a single write operation uses two or more different write currents. A first write current is initially used, and is large enough to achieve desired magnetic flux at the disk. After the write current heats and expands the arm tip, and extends it toward the disk surface, the write current is reduced, to avoid or postpone the time at which thermal expansion might cause the tip to contact the disk, or cause other undesirable effects.

55 Claims, 4 Drawing Sheets

METHOD AND APPARATUS TO CONTROL POLE TIP PROTRUSION

CROSS-REFERENCE TO RELATED APPLICATION

The present application claims the benefit of U.S. Provisional Patent Application Ser. No. 60/345,441, filed Jan. 4, 2002, incorporated herein by reference in its entirety.

TECHNICAL FIELD

The present application is directed to a method and apparatus to control the amount by which thermal expansion causes a read head, a write head and/or a read/write head to extend toward a data storage medium ("pole tip protrusion") and in particular to a method and apparatus for changing the magnitude of a write current, or other heat source, during an extended write operation (i.e., an operation in which the write current or other heat source is substantially uninterrupted, other than at servo sectors and the like, or is otherwise sufficiently extended or continuous to potentially cause undesirable amounts of pole tip protrusion, at least with some write currents).

BACKGROUND INFORMATION

Data storage devices including, e.g., those normally provided as part of, or in connection with, a computer or other electronic device, can be of various types. In one general category, data is stored on a fixed or rotating (or otherwise movable) data storage medium and a read head, a write head and/or a read/write head is positioned adjacent desired locations of the medium for writing data thereto or reading data therefrom. One common example of a data storage device of this type is a disk drive (often called a "hard" disk or "fixed" disk drive). Although many concepts and aspects pertaining to the present invention will be described, herein, in the context of a disk drive, those with skill in the art, after understanding the present disclosure, will appreciate that the advantages provided by the present invention are not necessarily limited to disk drives.

In one type of disk drive, the medium is one or more rotatable disks having magnetizable coatings and rotatable about a rotation axis. An arm is mounted to position the tip of the arm anywhere along an arcuate path which intersects substantially all radial positions of the data recording surface of the disk. The arm tip, which bears a read head, a write head and/or a read/write head is mounted and configured in such a way that (owing at least in part to aerodynamic effects) the tip is substantially maintained spaced from, but relatively close to (such as on the order of a few nanometers) the data-bearing surface of the disk. In most configurations it is desirable to avoid or eliminate instances of contact with data-bearing surfaces of the disk (although contact may be provided at other places and times such as during disk spin-up or spin-down, parking operations, non-data-bearing areas, and the like). Data and/or servo information is provided to disk control (or other) circuitry or components and/or to a computer or other host device, e.g., using flex circuits and the like.

Although manufacture, distribution and use of disk drives follow a number of models, in at least some cases, following assembly of a disk drive, one or more testing procedures are performed. Often, testing is provided which is intended to identify, before they are distributed to users, any disk drives which may exhibit performance or reliability issues, such as having an unacceptably high bit error rate (BER) or other error measure. Because drive failure rates during such testing are correlated with factory costs, it would be advantageous to provide a method and/or apparatus which can reduce the failure rates.

In addition to reliability/performance testing, environmental testing may be performed. In some situations, environmental testing includes measuring and/or storing data related to how certain aspects of the disk drive react to various temperatures, pressures or other environmental factors. For example, environmental testing may be used to store information to control the magnitude of write head current as a function of ambient temperature (e.g., since a higher write current may be needed before the disk drive has "warmed up"). Typically, such ambient temperature corrections are performed on a relatively long time scale such as longer than a typical continuous write operation.

Other operations may be performed prior to normal use of the disk drive (i.e., prior to use for reading and/or writing data sent to, or received from, the computer or other host device). In one such operation, the disk is provided with sector markers or identifiers and track markers or identifiers (referred to herein as "location information"). Location information is generally distinguishable from data at least in that location information is typically used for purposes of positioning the read/write heads (typically, internally to the disk drive) while data is received from or sent to the computer or other host device. The location information (or "servo" information) is typically provided on the disk prior to any normal use of the disk. Further, as a general rule, the location information, once it is provided on the disk, is not, thereafter, altered or erased while, in most disk drives, data can be erased or written-over (although in some applications, some or all portions of disks may be designated as "read-only").

The general trend in data storage, including disk drives, has been for increasingly higher data density on the medium. Higher densities permit not only construction of a physically smaller data storage device, for a given capacity, but also can assist in enhancing performance (reducing seek times, and the like). As will be understood by those skilled in the art, increases in data density are often associated with reductions in the distance between the read/write head and the medium (reduction in "flying height"). Among the technical difficulties encountered when attempting to reduce flying height, a dilemma arises which is related to the pole tip protrusion (PTP) phenomenon. During a write operation, current is provided to the write head. Write current causes an amount of heating of the read/write head or arm tip, which, in turn, causes thermal expansion resulting in protrusion of the tip towards the surface of the medium. It has been found that, at moderately high write currents, the amount of thermal expansion of the arm tip is so large that, for prolonged write operations (e.g., substantially continuous writes over multiple disk segments), the tip may protrude sufficiently to contact a medium. This is an especially large risk if the nominal flying height of the head is small. On the other hand, if the magnitude of the write current is reduced, in an attempt to avoid contact, the tip (and thus the write head) during the first portion of the write operation (i.e., before the tip has substantially heated and expanded) may be too far from the medium, such as being so far from the medium that, at the reduced write current, the magnetic flux provided by the write head is insufficient to saturate the medium, and thus is insufficient to write or erase data, as desired.

Accordingly, it would be desirable to provide a method and apparatus which can achieve a low flying height while both providing magnetic saturation throughout the write operation and avoiding contact with the data medium throughout the write operation.

SUMMARY

The present invention includes recognition and appreciation of the existence, nature and consequences of problems of previous approaches, including as described herein.

According to one aspect of the present invention, the magnitude of a write current is changed within a relatively short period (i.e., a relatively short period from the initiation of the write current until write current adjustment begins). In one aspect, write current is changed within the period of a single write operation. For example, the write current may be provided with the first magnitude while performing a write on (preferably contiguous) sectors 1 through K and a different (preferably lower) write current is used for the portion of the (same) write operation which is performed on disk sectors K+1 through N. Without wishing to be bound by any theory, it is believed useful to define or select the value of K (in one embodiment) so as to be related to the pole tip protrusion time constant. In other embodiments, other time-variations of write current within a write operation ("profiles") can be used, such as providing more than two different values of write current within a single write operation, providing substantially continuously varying write currents, varying the slope or shape of all or a portion of the write current profile, and the like. Typically, a disk drive may have multiple disks and/or arms and it is believed useful to separately characterize, optimize and/or store write current parameters (such as start current, stop current, current profile parameters and the like) for each of the various disks and/or arms. In these, and other ways, it is possible to provide a relatively low flying height in a disk drive while achieving desired data storage medium saturation during the initial portion of a write operation (by using a relatively high write current), yet avoiding thermal-expansion-induced contact events (or other undesirable consequences), by reducing the magnitude of the write current during later portions of the write operation. The present invention includes a recognition and/or appropriate appreciation of the fact that, following an amount of pole tip protrusion, when the write head has moved relatively close to the medium, the amount of write current necessary to saturate the medium is less than it was during the early portion of the write operation (before substantial pole tip protrusion) when the write head was relatively farther from the data storage medium.

A method and apparatus to control the amount by which thermal expansion causes a write head to extend toward a disk is provided. In one aspect, a single write operation uses two or more different write currents. A first write current is initially used, and is large enough to achieve desired magnetic flux at the disk. After the write current heats and expands the arm tip, and extends it toward the disk surface, the write current is reduced, to avoid or postpone the time at which thermal expansion might cause the tip to contact the disk, or cause other undesirable effects.

DETAILED DESCRIPTION OF THE PREFERRED EMBODIMENT

Figure 1:
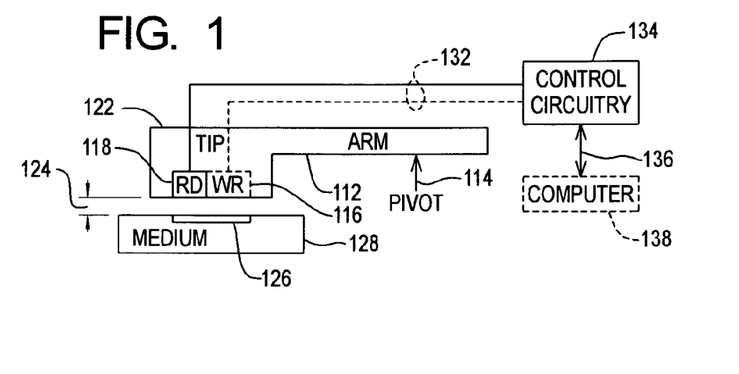
FIG. 1 is a simplified block diagram of selected components of a disk drive, of a type which can be used in connection with embodiments of the present invention optionally coupled to a computer.

As depicted in block diagram form, in FIG. 1, a disk drive can include an arm 112 movable, e.g. by rotation about a pivot 114 so as to position a write head 116 and/or read head 118 on the tip 122 of the arm 112 adjacent, but spaced a distance 124 from a desired or selected location 126 of a medium 128. Data which is sent to the write head 116 or received from the read head 118 is provided by a flex circuitry or other pathways 132 to disk drive circuitry 134. Circuitry 134 can be configured to perform a number of functions including controlling relative movement of the arm 112 and/or medium 128, performing conditioning, buffering, error correction and the like on data sent from or received from 136 a computer 138 or other host device. The mounting, relative positioning and aerodynamic behavior of the arm (particularly the tip 122) with respect to the adjacent surface of the medium 128 are configured to preferably provide a spacing 124 which is large enough to substantially avoid contact of the tip 122 with the medium 128 during normal read-write use of the disk drive. Preferably, the spacing 124 is small enough to achieve the desired read-write functionality across the spacing 124. In general, smaller values of the spacing 124 are useful in achieving higher data density on the medium surface.

Figure 7:
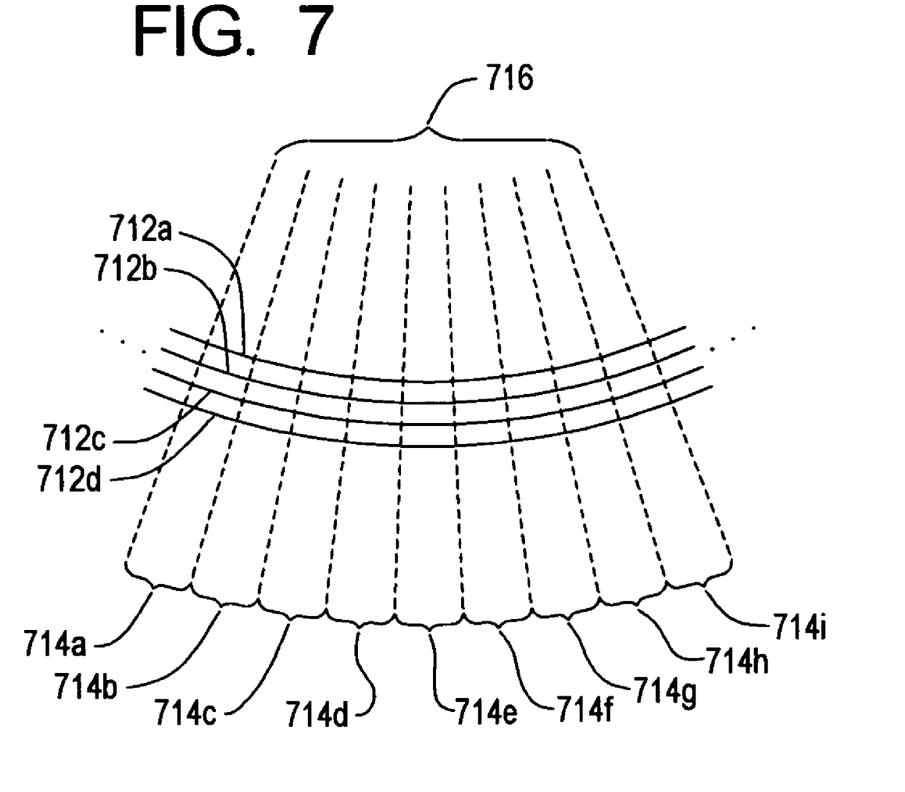

Although the present invention can be used in the context of many types of data storage devices and, e.g. in the case of disk drives, many types of data and servo organization, for purposes of illustration, FIG. 7 schematically, and in simplified fashion, illustrates one general type of spatial organization for a disk of a type usable in connection with embodiments of the present invention. In the illustration of FIG. 7, data is organized into generally concentric tracks 712a to 712d; and, circumferentially along the tracks in a plurality of sectors 714a through 714i. In general, the surface of the data storage medium will include both location information ("servo" information) and data. Typically, circumferentially along any track, a number of groups of sectors are found, collectively referred herein as an "H" sector, with each H sector consisting of location information (a "servo sector") followed by a plurality of data sectors, referred to herein as "Z" sectors. In the simplified illustration of FIG. 7, H sector 716 consists of a servo sector 714a followed by eight data or "Z" sectors 714b through 714i.

It is common, in data storage operations, to have a capability for writing relatively large amounts of data (e.g., multiple sectors), preferably as quickly as possible, to the data storage medium. It has been found that providing for extended write operations, such as involving an uninterrupted write to three or more data sectors, can involve a design choice between achieving a low flying height, (which can facilitate high performance) and risking contact of the arm tip with the medium (which is a greater risk for low flying heights). This choice was not commonly faced in many previous approaches which used a relatively higher flying height. However, as attempts have been made to achieve relatively lower flying height, thermal expansion, particularly of the arm tip 122, represents a significant impact on how small the spacing 124 can be.

Figure 2:
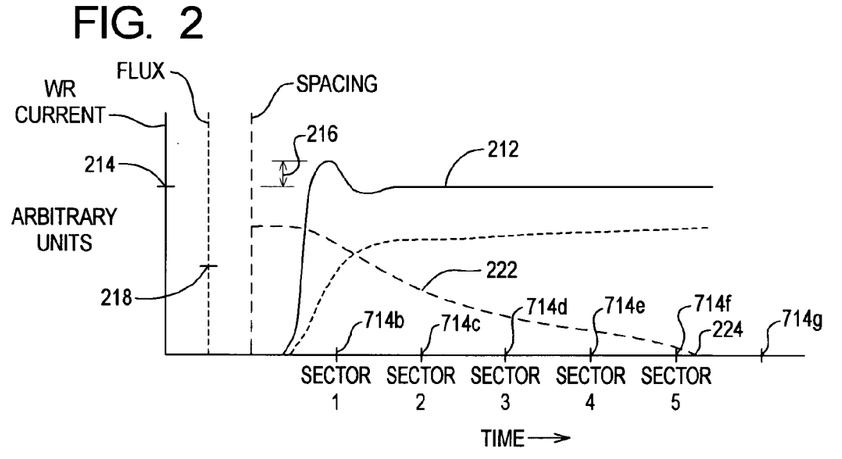
FIG. 2 is a graph showing, in arbitrary units, a time-profile of write current, magnetic flux and head-to-medium spacing during an extended write operation.

As illustrated in FIG. 2, when it is desired to perform a write operation across multiple sectors, e.g. 714b through 714g, write current is provided to the write head 116 (under control of circuitry 134, generally in advance of the write head 116 being aligned with the first data sector 714b). The timing and target magnitude 214 of the write current are selected (often as part of a characterization process), typically also including an initial overshoot 216, so as to achieve a magnetic flux magnitude 218 (at the surface of the disk) sufficient to saturate the medium and achieve writing as desired. As noted above, the current in the write head 116, in addition to providing magnetic flux to the medium, also creates an amount of heat. Such heat results in thermal expansion of the tip 122 and this expansion effectively decreases the spacing 124. As shown in FIG. 2, the time profile of the spacing decreases 222 and, in the situation depicted in FIG. 2, thermal expansion is eventually large enough to cause the spacing 124 to decrease to zero 224, resulting in a contact event. Without wishing to be bound by any theory, it is believed that the decrease in spacing 222 as a function of time can be, to a first approximation, described as a negative exponential function, i.e. of the form $e^{-kt}$. Other factors, such as the increasing effectiveness of the medium 128 as a heat sink, as the spacing 124 diminishes, and/or other factors, result in departure of actual performance from the exponential model. Nevertheless, the time profile of the deceasing spacing 124 can be characterized generally by the time constant, e.g. the amount of time required for the spacing 124 to be reduced to e.g. five percent of its steady state (asymptotic) value. A number of factors can influence the profile of the spacing reduction 124. For example, the magnitude of the write current can affect the thermal expansion of the tip 122.

Figure 3:
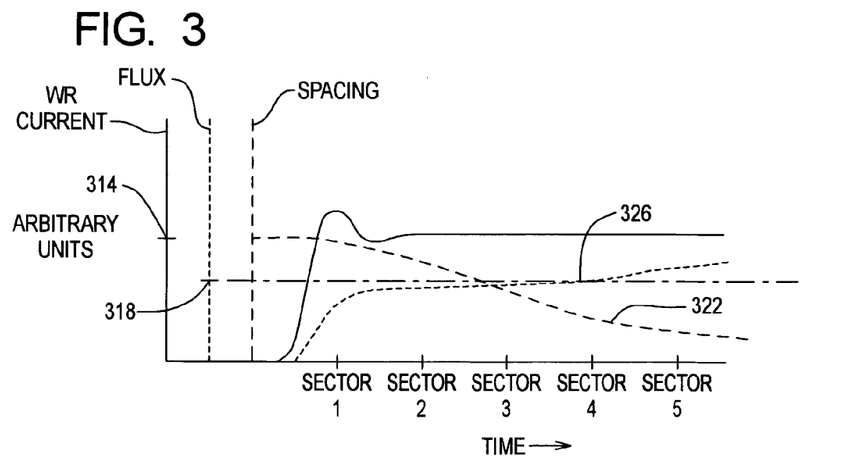
FIG. 3 is a graph, generally similar to that of FIG. 2, but with a smaller-magnitude write current.

However, merely reducing the write current magnitude will not achieve desired results, as illustrated in FIG. 3. In the illustration of FIG. 3, the magnitude of the write current 314 is reduced (compared to that of FIG. 2). The resultant change in the spacing profile 322 means that the contact event is avoided (or at least postponed). However, as also shown in FIG. 3, the value of flux 318 needed to achieve saturation at the medium 128 if not achieved, using the lower write current, until a point 326 later in the attempted write process, and accordingly data cannot be written in the first three sectors.

As a result of the situation illustrated in FIGS. 2 and 3, it is believed that attempts to provide low fly height disk drives (e.g., to achieve increased capacity) will result in an increase in the number of disk drives which fail initial testing e.g. because of head contact events during extended writes.

Figure 4:
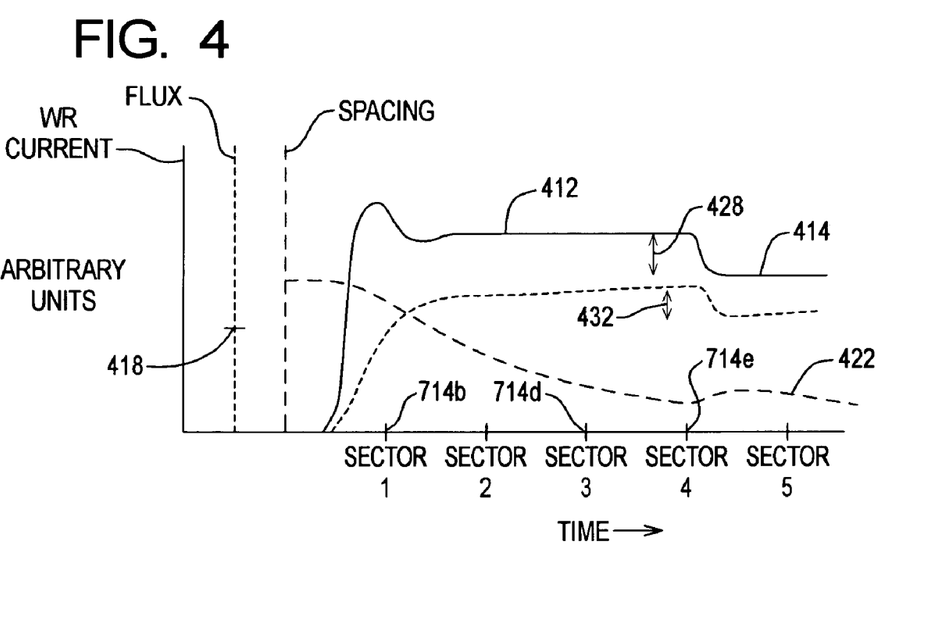
FIG. 4 is a graph, similar to that of FIG. 2, but showing a change in write current, in the course of an extended write operation, in accordance with one embodiment of the present invention.

According to an embodiment of the present invention, this disadvantageous aspect of low fly height disk drives is eliminated or reduced by changing the magnitude of the write current during a data write operation. A simplified example of this approach is illustrated in FIG. 4. FIG. 4 is substantially identical to FIG. 2 up until sector 714e. As shown in FIG. 4, at, or just before, the beginning of writing to sector 4, the write current 412 is reduced in magnitude 428. This causes a reduction in the amount of heating of the tip 122 and accordingly, reduces (or delays) the amount by which the head-to-medium spacing is diminished, as shown by the spacing time-profile 422. Even though the reduction in the write current 428 also causes a drop in the magnitude of the flux 432, the flux continues to be above the minimum flux 418 required to saturate the medium. Without wishing to be bound by any theory, it is believed that sufficient flux at the medium is maintained, at sectors 4, and later, despite the decrease in write current, at least partially because the write head 116 is positioned relatively closer to the medium (as shown by the spacing profile 422) due to the thermal expansion that occurred during the early portion of the write operation (e.g., sectors 1–3, 714b through 714d).

One of the sources of the problems solved by the present invention relates to the fact that the time constant for the expansion of the tip 122 (or, equivalently, the reduction of the spacing 124) is relatively short (in some configurations, about 0.5 ms to 1 ms) and that this time constant is equivalent to many data sectors at the desired high density, so that there is a significant change in the spacing 124 over the course of an extended write operation. However, the relatively small time constant also means that adjustment or change in the write current to achieve the desired results, e.g. as illustrated in FIG. 4, must be made on a relatively short time scale. Although changes in write current had been tried previously, for other purposes, e.g. as the disk drive warms up, such previous changes were typically made on relatively large time scales (e.g., at least a few seconds). Accordingly, embodiments of the present invention include approaches, procedures, and devices intended to change write current on relatively short time scales such as 1 microsecond, preferably about, or less than, 0.5 microseconds.

Figure 5:
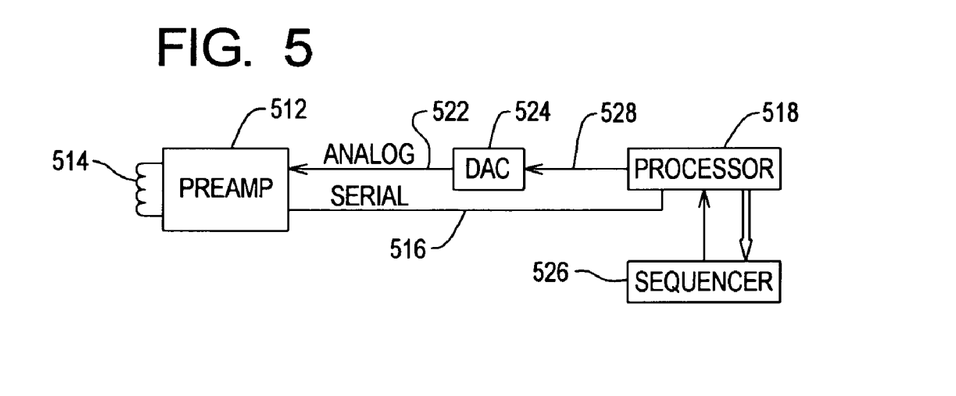
FIG. 5 is a block diagram depicting selected components of a disk drive that can be used in accordance with an embodiment of the present invention.

FIG. 5 illustrates components in an apparatus of a type which can be used in accordance with one embodiment of the present invention. In the embodiment of FIG. 5, the preamp 512, used to provide current to the write coil 514, in addition to the serial-control/data line 516, coupled to processor 518, is also provided with an analog control line 522, e.g. via a digital-to-analog converter 524. The preamp 512 is configured such that the magnitude of the signal on the analog control line 522 controls the magnitude of the write current 514. Those skilled in the art will understand numerous ways of configuring a preamp in this fashion, at least after understanding the present disclosure.

Previous configurations typically did not provide an analog control line 522, and, instead, used the serial line 516 for establishing a write current amplitude (e.g., by storing a value in a register, internal to the preamp 512). In use, a sequencer 528 provides information to the processor 518 indicative of, e.g., the number of Z-sectors written. Preferably, information indicative of the desired profile of write current adjustment is stored in, or available to, the processor 518. Other values used in determining a write current magnitude can also be provided and/or stored, such as values indicative of an overshoot magnitude 216, one or more offsets for accommodating changes in ambient temperature, pressure and the like, or other parameters. In one embodiment, information which can be used to describe or characterize a write current profile is predetermined (e.g., during an initialization phase, e.g. typically prior to delivery of a disk drive to a purchaser) and such information is stored on the disk. In one embodiment, such information is read from the disk and stored in the processor 518 such as in a memory or register of the processor 518, upon power up or other disk drive event. In one embodiment, the information includes the magnitude of the desired or "target" initial write voltage 412, the magnitude of a second, lower target voltage 414, and information indicative of the time or delay when a transition should be made from the first target voltage 412 to the second target voltage 414. In one embodiment, the indication of the target time or delay can include a sector number (such as storing the number of sectors to be written at the first target voltage 412 before a transition is made to the second target voltage 414). For example, in the illustration of FIG. 4, it would be possible to store "3" as the time-indicator to indicate that three sectors should be written at the first, higher write voltage or current 412 before transition to the second write current 414 at the beginning of the fourth sector. In other embodiments, the sector number (e.g., "3") is fixed and only the second write current magnitude is read from the disk, or vice versa.

In the embodiment of FIG. 5, software, firmware, or both, are configured to control the processor 518 so as to put a digital signal on output line 528 at the initiation of a write operation which, after processing by digital-to-analog converter 524, supplies an analog signal 522 having a magnitude which will cause the preamp 512 to output the initial write current 412. The software or firmware is further configured to monitor the "sectors written" information provided by the sequencer 526 and, when the target number of sectors have been written, to output a second, different signal on output line 528 having a value which, after processing by digital-to-analog converter 524, produces an analog signal 522 of a magnitude which causes preamp 512 to provide a write current having a second, lower magnitude 414. Those of skill in the art will understand how to select, provide, configure and/or program a processor 518 to achieve the described process, at least after understanding the present disclosure. Those of skill in the art will understand how to provide, store and use appropriate software or firmware, at least after understanding the present disclosure.

It is possible to provide embodiments of the present invention in which write operations use two write current magnitudes 412, 414 (as illustrated) or to provide three or more different write currents (e.g., by defining, storing and using additional information to define sectors when additional transitions should take place and defining additional write current magnitudes). It is at least theoretically possible to substantially continuously adjust write current in accordance with predetermined parameters, or in response to a feedback signal 1 (e.g., that directly or indirectly indicates spacing 124).

As noted above, the embodiment of FIG. 5 involves providing an analog signal, directly or indirectly, from the processor 518 to the preamp 512. In some configurations, it may be desirable implement embodiments of the present invention without using an analog input 522. One potential advantage for such an approach is that, since previous apparatuses typically did not provide an analog input 522, embodiments which do not use an analog input could potentially be implemented without making substantial circuitry or other hardware changes, i.e., they could be substantially implemented by making changes to software or firmware (or both). For example, as noted above, in some devices a serial line 516 can be used to provide serial information into the preamp 512 (e.g., for storage in a register or the like) that can determine magnitude of the write current. Accordingly, in one embodiment of the present invention, the processor 518, at the beginning of a write operation, sends a data signal on serial line 516 to preamp 512 which causes preamp 512 to store, in a write magnitude register, a value which is used by the preamp to output a write current having a first magnitude 412. At a later point in time, such as in response to information provided by the sequencer 526, the processor 518 sends a different signal on the serial line 516 causing a second, different value to be stored in the write current register of the preamp 512, causing the preamp to provide a write current having a second magnitude 414. In general, the response of a system such of that described is expected to be slower than that of the system described in connection with FIG. 5, largely because of the larger amount of time required to write serial information into a register, in a typical situation. Accordingly, in one embodiment, adjustments to write current are made relatively less frequently, such as at the beginning an "H" or servo sector, rather than at the beginning of a "Z" sector. (Since data is not written into a servo sector, typically, the entire time required for transit of an H or servo sector can be utilized for the serial data process, which is completed before the head reaches the first Z sector.) It is believed, in this way, it is feasible to implement embodiments of the present invention without making changes to the preamp or flex circuitry.

In one embodiment, values to be used for controlling the write current are determined and stored separately for each head/disk/preamp combination, preferably during an early manufacturing or test phase such as during environmental testing and/or as part of engineering verification testing for a disk drive. In one embodiment, write current magnitude will be a combination of an offset value plus either an initial write current (used during the initial portion of a write operation) or a lower write current (used during later portions of the write operation). In one embodiment, the lower write current is substantially equal to the lowest current which saturates the medium for the fourth sector written and the initial write current is the lowest write current that saturates the medium for the first sector written. Although it is possible to determine write currents for use as the initial write and lower write current on the basis of theoretical considerations and/or calculations, modeling, and the like, it is presently preferred to determine one or both of the values empirically, such as on the basis of measurements, testing, precharacterization, and/or similar procedures including as described below.

Figure 6:
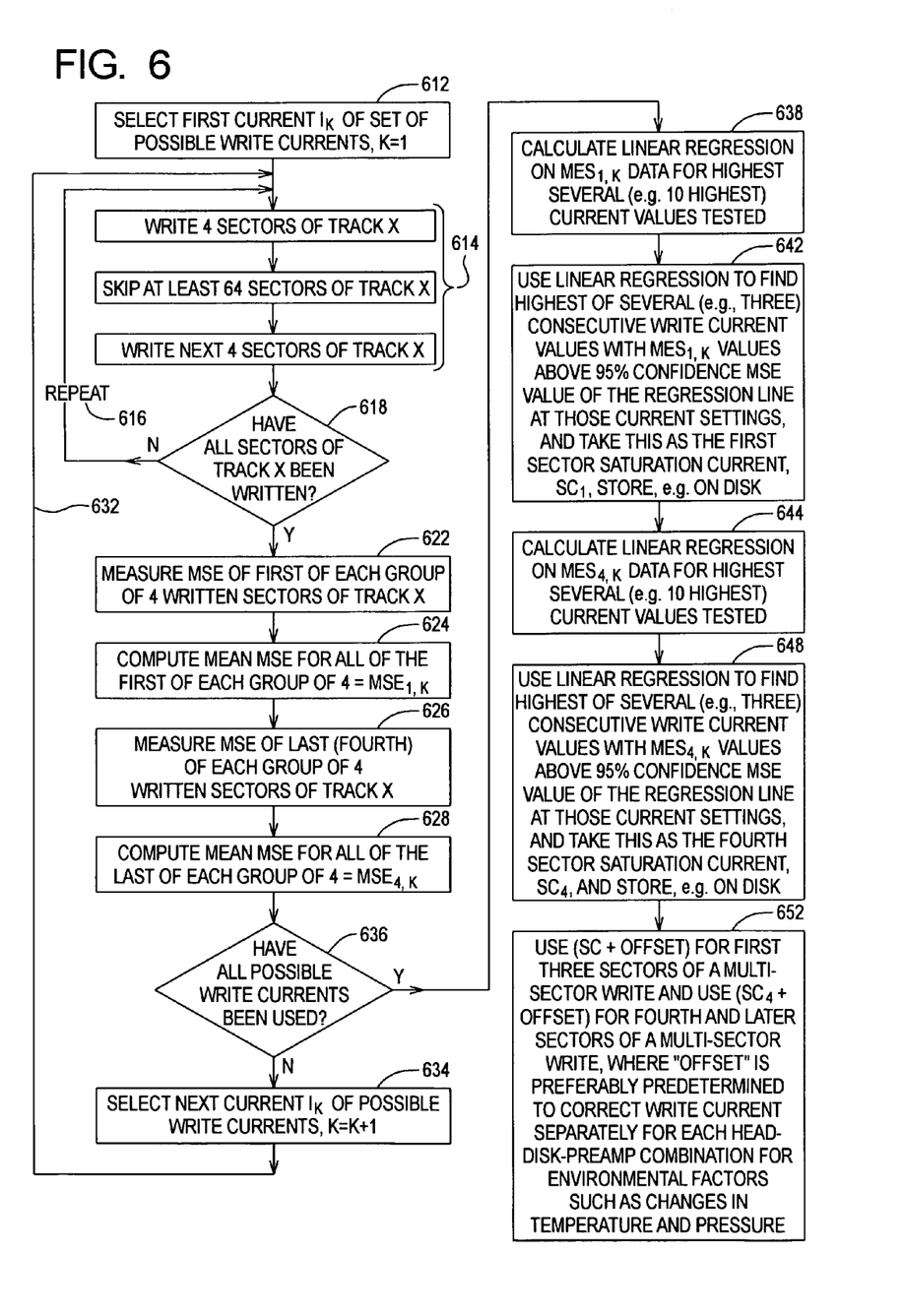
FIG. 6 is a flow chart of a procedure which can be used in accordance with an embodiment of the present invention; and, FIG. 7 is a simplified, partial plan view of a data recording surface of a disk of a type usable in accordance with an embodiment of the present invention.

In the approach illustrated in FIG. 6, a finite number of write current magnitudes $I_k$ are used during an initialization or characterization procedure, which is preferably performed for each head/disk/preamp combination used in a particular disk drive. As shown in FIG. 6, initially a first potential write current $I_k$ (K=1) is selected 612. A plurality of groups of four sectors, preferably spaced apart at least 64 sectors, are written 614. This procedure is repeated 616 until all sectors of a track (track X) have been written 618. The mean square error (MSE) of each of the groups of four sectors which were written, on track X, is measured 622. Those with skill in the art will understand how to use disk drive components and circuitry, or other components and circuitry, to perform such measurements. The mean of the MSE for all of the groups of four sectors is computed 624. A similar measurement of MSE and mean MSE is performed for the last (fourth) sector of each group of four written sectors 626, 628. The above-described procedure is then repeated 632 after incrementing K (i.e., selecting the next current out of the set of possible write currents to be tested) 634 until all possible write currents have been tested 636. After all possible write currents $I_k$ have been tested in this manner, a linear regression is calculated on the $MSE_{1,k}$ data for the highest several (e.g., ten highest) current values tested 638. The linear regression is then used to find the highest of several (e.g., three) consecutive write current values with an $MSE_{1,k}$ value above e.g. the ninety-five percent confidence MSE value of the regression, at those current settings. This highest value is taken as the first sector saturation current $SC_1$ which is stored e.g. on the disk 642. The above-described linear regression procedure is then repeated for the $MSE_{4,k}$ data so as to obtain and store a fourth sector saturation current $SC_4$ 644, 648.

In this embodiment, the above-described steps 612 through 648 can be viewed as a characterization process. Information obtained during the characterization can then be used during normal use of the disk drive. For example, in the embodiment of FIG. 6, during a normal use step 652, $SC_1$ plus the offset is used as the write current for the first three sectors in a multi-sector write and $SC_4$, plus offset, is used for fourth (and later) sectors of a multi-sector write. Preferably the "offset" is predetermined e.g. to correct write current, separately for each head/disk/preamp combination, for environmental factors such as changes in temperature and pressure.

A number of variations and modifications of the invention can be used, including as described herein. Although embodiments of the present invention have been described in connection disk drives, some or all features of the present invention can be advantageous in the context of other devices including, without limitation, optical disk drives, magnetic tape storage, and the like. It is possible to use some features of the invention without using others. For example, it is possible to adjust the magnitude of a write current, during a write operation, without separately characterizing write current values for each head/disk/preamp combination. Although a process has been described in which write current start, stop, profile or other parameters are measured, determined, optimized and/or stored in a period prior to normal use of the disk drive, there is no theoretical reason why such values could not be recalculated or updated at other times, e.g. during maintenance or repair procedures, at periodic intervals, in response to errors or error rates and the like. Although a procedure has been described and depicted, it is possible to use other procedures, and/or modifications of the depicted procedure including e.g. providing more or fewer steps, and/or performing steps in an order different from that shown. Although embodiments have been described in which the timing of write current adjustments is related to the number of sectors written, such as Z-sectors written or H-sectors written, it is also possible to use other parameters such as the passage of time, measurements of head temperature, indications of PTP magnitude, fly height and the like. Although embodiments have been described in which values to be used for determining write current are stored separately for each head/disk/preamp combination, it is also possible to store values which are substantially invariant for a given model or product line, although it is currently believed such an approach would be less effective. Although embodiments have been described in which all write current changes are decreased, there is no theoretical reason why the write current cannot be increased, e.g. move the write head closer to the medium.

In light of the above description, a number of advantages of the present invention can be seen. The present invention can reduce or avoid instances of disk drive testing failures, particularly for low fly height and/or high capacity disk drives, thus effectively reducing factory costs for a disk drive (since fewer drives would be rejected during the test phase). Embodiments of the present invention may also be advantageous in reducing the rate or occurrence of disk drive failures and/or data loss events (including those associated with head-disk contact events) during normal use of a disk drive. Such improvements can provide not only direct benefits, such as reduced costs of maintenance, replacement, repair, shipping and the like, but can also provide indirect benefits such as enhancement of manufacturer's reputation for quality, particularly in connection with high capacity disk drives. In addition to being advantageous to manufacturers of disk drives and users of disk drives, the present invention can also be advantageous to manufacturers/assemblers of computers or other host devices which use data storage devices.

The present invention, in various embodiments, includes components, methods, processes, systems and/or apparatus substantially as depicted and described herein, including various embodiments, sub-combinations, and subsets thereof. Those with skill in the art will understand how to make and use the present invention after understanding the present disclosure. The present invention, and various embodiments, includes providing the devices and processes in the absence of items not depicted and/or described herein or in various embodiments hereof, including in the absence of such items as may have been used in previous devices or processes, e.g. for improving performance, achieving ease of and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the forms or form disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A disk drive apparatus comprising:

at least a first rotatable disk;

at least a first arm, having a tip with a write head, positionable adjacent selectable locations of said first disk, wherein said write head is provided with a current varying in a pattern configured to produce desired data recording at said disk;

circuitry configured to vary at least a first electrical parameter of said write head of said first arm, different from said pattern, during a substantially continuous data write operation, so as to achieve data writing despite changes in spacing between said tip and said first disk, wherein said circuitry configured to vary a first electrical parameter of said write head of said first arm includes circuitry configured to provide a first current to said write head during a first time period and a second, smaller, current to said write head during a second, later time period, said first current having a magnitude so as to substantially achieve writing of data to a first portion of said disk, said second current having a magnitude so as to both:

substantially achieve writing of data to a second portion of said disk; and substantially avoid heating said tip to a degree that would cause contact with said second portion of said disk.

2. Apparatus as claimed in claim 1, wherein said changes in spacing include changes which result, at least partially, from heating of said head caused by a write current.

3. Apparatus as claimed in claim 1, wherein said first electrical parameter is current.

4. Apparatus as claimed in claim 1, wherein said first electrical parameter is write current.

5. Apparatus as claimed in claim 1, wherein a single data write operation includes both said first time period and said second time period.

6. Apparatus as claimed in claim 1, wherein single data write operation occurs during normal use of said disk drive.

7. Apparatus as claimed in claim 1, wherein said first and second portions of said disk are substantially circumferentially contiguous, except for any included servo sectors.

8. Apparatus as claimed in claim 1, wherein said first and second portions of said disk include disk sectors which are substantially contiguous, except for any included servo sectors.

9. Apparatus as claimed in claim 1, wherein said circuitry configured to vary a first electrical parameter of said write head of said first arm includes circuitry configured to vary said first electrical parameter based on at least a first predetermined value.

10. Apparatus as claimed in claim 1, wherein said circuitry configured to vary a first electrical parameter of said write head of said first arm includes circuitry configured to vary said first electrical parameter based on values stored in a memory in response to a precharacterization.

11. Apparatus as claimed in claim 1, further comprising:
a second rotatable disk;
a second arm, having a tip with a write head, positionable adjacent selectable locations of said second disk;
circuitry configured to vary at least a first electrical parameter of said write head of said second arm, during a substantially continuous data write operation, so as to achieve data writing despite changes in spacing between said tip of said second arm and said second disk.

12. Apparatus as claimed in claim 11, wherein said circuitry configured to vary a first electrical parameter of said write head of said first arm includes circuitry configured to vary said first electrical parameter based on at least a first predetermined value, and wherein said circuitry configured to vary a first electrical parameter of said write head of said second arm includes circuitry configured to vary said first electrical parameter based on at least a second predetermined value.

13. Apparatus as claimed in claim 12, wherein said first and second predetermined values are stored in a memory in response to a precharacterization.

14. Apparatus as claimed in claim 1, wherein said circuitry includes a firmware-programmable controller.

15. Apparatus as claimed in claim 1, wherein said circuitry includes a software-programmable controller.

16. A disk drive apparatus comprising:
at least a first rotatable disk;
at least a first arm, having a tip with a write head, positionable adjacent selectable locations of said first disk;
circuitry configured to provide write current during normal use of the disk drive which includes at least a first data write operation which includes both writing at a first location of said disk during a first time period and writing at a second location of said disk during a second, later time period by providing a first current to said write head during said first time period and a second, smaller, current to said write head during said second time period, wherein said first and second locations of said disk include portions that are substantially circumferentially contiguous with one another, except for any included servo sectors, said first current having a magnitude so as to substantially achieve writing of data to a first portion of said disk, said second current having a magnitude so as to both:
substantially achieve writing of data to a second portion of said disk; and
substantially avoid heating said tip to a degree that would cause contact with said second portion of said disk.

17. A disk drive apparatus as claimed in claim 16, further comprising circuitry for detecting the number of data sectors thus far written, during a write operation, and wherein commencement of said second time period is determined based on the number of data sectors thus far written.

18. A disk drive apparatus as claimed in claim 16, wherein said disk drive includes at least a first preamp, for providing write current, further comprising providing a conductive path from said circuitry to said preamp for transmitting a signal or data to establish the magnitude of the write current.

19. Apparatus as claimed in claim 18, wherein said conductive path includes an analog signal line, and wherein said preamp is configured to output a write current whose magnitude is bases on the signal on said analog signal line.

20. Apparatus as claimed in claim 18, wherein said conductive path includes a serial data line, and wherein said preamp is configured to store data received on said serial data line in at least a first register, and to output a write current whose magnitude is based on the value stored in at least said first register.

21. Apparatus as claimed in claim 16, wherein the magnitude of at least said second write current is based on information stored on said disk.

22. Apparatus as claimed in claim 16, wherein the magnitude of at least said second write current is based on information obtained during a precharacterization process of said disk drive.

23. Apparatus as claimed in claim 16, wherein the duration of at least said first time period is based on information stored on said disk.

24. Apparatus as claimed in claim 16, wherein the duration of at least said first time period is based on information obtained during a precharacterization process of said disk drive.

25. A disk drive apparatus comprising:
at least a first rotatable disk;
at least a first arm, having a tip with a write head, positionable adjacent selectable locations of said first disk;
circuitry configured to provide write current during normal use of the disk drive which includes at least a first data write operation which includes both writing at a first location of said disk during a first time period and writing at a second location of said disk during a second, later time period by providing write current to said write head, said write head defining a time-profile of write current magnitude, wherein said write current includes at least a first current during said first time period and a second, smaller, current during said second time period, wherein said first and second locations of said disk include portions that are substantially circumferentially contiguous with one another, except for any included servo sectors, said first current having a magnitude so as to substantially achieve writing of data to a first portion of said disk, said second current having a magnitude so as to both:

substantially achieve writing of data to a second portion of said disk; and substantially avoid heating said tip to a degree that would cause contact with said second portion of said disk.

26. Apparatus as claimed in claim 25, wherein said write current profile is based on information stored on said disk.

27. Apparatus as claimed in claim 25, wherein said write current profile is based on information obtained during a precharacterization process of said disk drive.

28. A data storage apparatus comprising:

at least a first data storage medium;

at least a first write head movably mounted with respect to said first data storage medium so as to permit positioning said first write head adjacent to, and defining spacings from, desired locations of said data storage medium;

control circuitry which can provide signals to said write head so as to write data on said first data storage medium, including writing data to a plurality of substantially contiguous locations of said data storage medium;

said control circuitry further adjusting an amount of heating, wherein thermal expansion provides at least first and second different spacings during writing data to a plurality of substantially contiguous locations, including first and second portions of data storage medium;

said first spacing having a magnitude so as to substantially achieve writing of data to said first portion of said data storage medium, said second spacing having a magnitude so as to both:

substantially achieve writing of data to said second portion of said data storage medium; and substantially avoiding contact with said second portion of said data storage medium.

29. Apparatus, as claimed in claim 28, wherein said data storage medium is a disk with a magnetizable surface.

30. Apparatus as claimed in claim 29, wherein said data recording device further includes one or more write heads and one or more preamps, said circuitry which adjusts the magnitude of write current includes circuitry which provides separate adjustments for each head/disk/preamp combination in said data recording device.

31. Apparatus as claimed in claim 28, wherein said circuitry adjusting an amount of heating includes circuitry which adjusts the magnitude of write current provided to said write head.

32. Apparatus as claimed in claim 31, wherein said circuitry which adjusts the magnitude of write current includes circuitry which diminishes the magnitude of the write current, compared to the initial magnitude.

33. Apparatus as claimed in claim 31, wherein said data storage medium is configured to define a plurality of tracks and wherein said circuitry which adjusts the magnitude of write current includes circuitry which provides at least first and second different adjustments for at least first and second different tracks.

34. Apparatus as claimed in claim 31, wherein said data storage medium is configured to define a plurality of tracks and wherein said circuitry which adjusts the magnitude of write current includes circuitry which provides at least first and second different adjustments for at least first and second different portions of at least a first track.

35. Apparatus as claimed in claim 28, wherein said circuitry adjusting an amount of heating includes circuitry configured to vary said amount of heating based on at least a first predetermined value.

36. Apparatus as claimed in claim 35, wherein said predetermined value is indicative of the lowest write head current which saturates the medium for the Kth sector of a multi-sector write operation.

37. Apparatus as claimed in claim 36, wherein K equals 4.

38. Apparatus as claimed in claim 28, wherein said circuitry adjusting an amount of heating includes circuitry configured to vary said amount of heating based on a parameter which is indicative of at least one of said spacings.

39. A method, for use in a disk drive, the disk drive including a first rotatable disk and at least a first arm, having a tip with a write head, positionable adjacent selectable locations of said first disk, wherein said write head is provided with a current varying in a pattern configured to produce desired data recording at said disk, the method comprising the steps of:

varying at least a first electrical parameter of said write head of said first arm different from said first pattern;

wherein said varying occurs during a substantially continuous data write operation;

wherein said varying is configured so as to achieve data writing despite changes in spacing between said tip and said first disk which result, at least partially, from heating of said head caused by a write current; and wherein said varying includes providing a first current to said write head during a first time period and a second, smaller, current to said write head during a second, later time period, said first current having a magnitude so as to substantially achieve writing of data to a first portion of said disk, said second current having a magnitude so as to both:

substantially achieve writing of data to a second portion of said disk; and substantially avoid heating said tip to a degree that would cause contact with said second portion of said disk.

40. A method, as claimed in claim 39, wherein said first electrical parameter is write current.

41. A method, as claimed in claim 39, wherein a single data write operation includes both said first time period and said second time period.

42. A method, as claimed in claim 39, wherein said single data write operation occurs during normal use of said disk drive.

43. A method, as claimed in claim 39, wherein said first and second portions of said disk are substantially circumferentially contiguous, except for any included servo sectors.

44. A method, as claimed in claim 39, wherein said first and second portions of said disk include disk sectors which are substantially contiguous, except for any included servo sectors.

45. A method as claimed in claim 39, wherein said varying includes varying write current based on at least a first predetermined value.

46. A method as claimed in claim 39, wherein said varying includes varying write current based on values stored in a memory in response to a precharacterization.

47. A method as claimed in claim 39, wherein said step of varying includes providing a third current to said write head during a third time period, said third current differing from at least one of said first write current and said second write current.

48. A disk drive apparatus comprising:
at least a first rotatable disk;
at least a first arm, having a tip with a write head, positionable adjacent selectable locations of said first disk, wherein said write head is provided with a current varying in a pattern configured to produce desired data recording at said disk;
means for varying at least a first electrical parameter of said write head of said first arm different from said first pattern;
wherein said varying occurs during a substantially continuous data write operation;
wherein said varying is configured so as to achieve data writing despite changes in spacing between said tip and said first disk which result, at least partially, from heating of said head caused by a write current; and
wherein said means for varying includes means for providing a first current to said write head during a first time period and a second, smaller, current to said write head during a second, later time period, said first current having a magnitude so as to substantially achieve writing of data to a first portion of said disk, said second current having a magnitude so as to both:
substantially achieve writing of data to a second portion of said disk; and
substantially avoid heating said tip to a degree that would cause contact with said second portion of said disk.

49. Apparatus, as claimed in claim 48, wherein said first electrical parameter is write current.

50. Apparatus, as claimed in claim 48, wherein a single data write operation includes both said first time period and said second time period.

51. Apparatus, as claimed in claim 50, wherein said single data write operation occurs during normal use of said disk drive.

52. Apparatus, as claimed in claim 48, wherein said first and second portions of said disk are substantially circumferentially contiguous, except for any included servo sectors.

53. Apparatus, as claimed in claim 48, wherein said first and second portions of said disk include disk sectors which are substantially contiguous, except for any included servo sectors.

54. Apparatus as claimed in claim 48, wherein said means for varying includes means for varying write current based on at least a first predetermined value.

55. Apparatus as claimed in claim 48, wherein said means for varying includes means for varying write current based on values stored in a memory in response to a precharacterization.

* * * * *